United States Patent Office 3,037,045
Patented May 29, 1962

3,037,045
N-CYCLOALKYL CARBAMATES
Bruce W. Horrom, Waukegan, Ill., assignor to Abbott Laboratories, North Chicago, Ill., a corporation of Illinois
No Drawing. Filed Sept. 14, 1959, Ser. No. 839,569
2 Claims. (Cl. 260—468)

This invention relates to novel cycloalkyl carbamates, in particular, N-cycloalkyl-2-methyl-2-(n)propyl-1,3-propanediol dicarbamates. The novel compounds of this invention are represented by the following chemical structure:

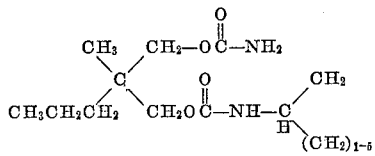

where the $CH_2$ symbol in parenthesis and the numerical range adjacent thereto indicate that the cycloalkyl group may be cyclopropyl, cyclobutyl, cyclopentyl, cyclohexyl or cycloheptyl.

The foregoing compounds are pharmacologically useful as muscle relaxants, tranquilizers, analgesics and hypothermic agents. The muscle relaxant property is of the centrally acting type as distinguished from the peripherally acting relaxants such as the curare-like compounds. It is believed that muscle relaxants ease excessive skeletal muscle tension by interrupting synaptic transmissions within the spinal cord. This property is well understood by the skilled pharmacologist and is recognized by him through signs of muscle flaccidity, animal behavior and other tests within his armamentarium. The tranquilizing properties are also observed by noting animal behavior, especially where natural aggressiveness of an animal, such as the mouse, dog, rat or monkey, is reduced following administration of the test compound under study. The term "analgesia" relates to the inhibition or reduction of sensitivity to pain. Such a property can also be evaluated by standard test methods known to the skilled pharmacologist. Hypothermic properties relate to the pharmacological phenomena of reducing the body temperature of a warm-blooded animal.

The compounds of this invention are prepared by a three-step method wherein 5-methyl-5-(n)propyl-2-m-dioxanone is stoichiometrically combined with a cycloalkylamine to form the corresponding cycloalkyl-2-methyl-2-(n)propyl-3-hydroxymethylpropyl carbamate. This formed intermediate is then successively reacted with phosgene in the presence of an acid acceptor such as triethylamine and ammonia to obtain the novel cycloalkyl carbamates. The foregoing steps are outlined in the following reaction sequence:

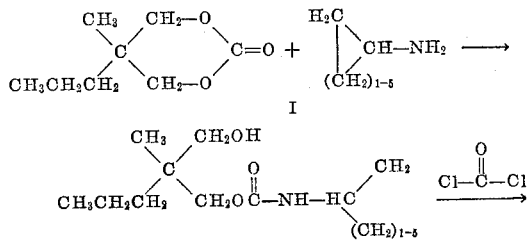

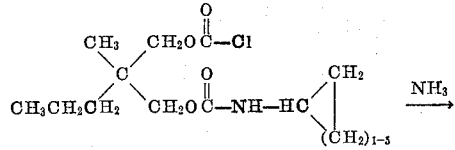

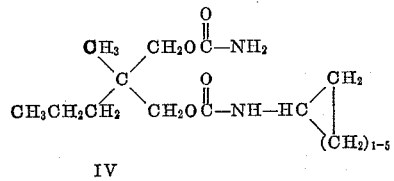

The cycloalkylamine I in the above outline represents saturated cycloalkylamines wherein the saturated cycloalkyl group contains 3 to 7 carbon atoms inclusive. The operable reactants are, accordingly, cyclopropylamine, cyclobutylamine, cyclopentylamine, cyclohexylamine or cycloheptylamine.

The following examples are presented to illustrate the preparation of the novel compounds disclosed herein. It is understood that alternative methods may be employed to prepare the identical compounds which are the subject matter of this invention.

EXAMPLE I

N-Cyclopropyl-2-Methyl-2-(n)Propyl-3-Hydroxypropyl Carbamate

A mixture comprising 73 g. (0.462 mole) of 5-methyl-5-(n)propyl-2-m-dioxanone and 57 g. (1.0 mole) of cyclopropylamine are refluxed on a steam bath for 24 hours. At the end of this period, the excess cyclopropylamine is removed by distillation under vacuum and the resulting thick oil is distilled. The intermediate, N-cyclopropyl-2-methyl-2-(n)propyl-3-hydroxypropyl carbamate is obtained in a yield of 86 g. (87%) and boils at 121–124° C. per 0.1 mm., $n_D^{27}$, 1.4619.

Analysis.—Calcd. for $C_{11}H_{21}NO_3$. Theory: C, 61.3%; H, 9.83%; N, 6.51%; O, 22.30%. Found: C, 61.24%; H, 9.99%; N, 6.31%; O. 22.40%.

EXAMPLE II

N-Cyclopropyl-2-Methyl-2-(n)Propyl-1,3-Propanediol Dicarbamate

To a solution of 25 g. (0.253 mole) of phosgene in 200 cc. of dry toluene is added a solution of 25.6 g. (0.253 mole) of triethylamine and 54.4 g. (0.253 mole) of N-cyclopropyl-2-methyl-2-(n)propyl-3-hydroxymethylpropyl carbamate in 100 cc. of dry chloroform. The temperature of the reaction is not allowed to rise above 12° C. during addition. The reaction mixture is stirred for awhile and then allowed to stir overnight. Following this period, an equal volume of ether is added to the reaction mixture and the mixture is then filtered. The filter cake is washed well with dry ether and the combined washes and filtrate which contain the intermediate chlorocarbonate are gassed with ammonia until basic. The reaction mixture is filtered again and concentrated under reduced pressure. A thick oil is obtained which, after trituration with pentane, solidifies. The product, N-cyclopropyl-2-methyl-2-(n)propyl-1,3-propanediol dicarbamate, is obtained in a yield of 94% (61 g.). After recrystallization from an ether-pentane mixture, the M.P. is 72–74° C.

*Analysis.*—Calcd. for $C_{12}H_{22}N_2O_4$. Theory: C, 55.79%; H, 5.58%; N, 10.85%. Found: C, 55.89%; H, 8.48%; N, 10.86%.

The process steps of the foregoing examples are repeated, but in place of the cyclopropylamine, other cycloalkylamines are used to prepare the novel cycloalkyl carbamates of the type defined herein. Thus, cyclobutylamine, cyclopentylamine, cyclohexylamine and cycloheptylamine are employed in the foregoing process steps and the corresponding cycloakyl carbamates are obtained: N-cyclobutyl-2-methyl-2-(n)propyl-1,3-propanediol dicarbamate, N-cyclopentyl-2-methyl-2-(n)propyl-1,3-propanediol dicarbamate, N-cyclohexyl-2-methyl-2-(n)propyl-1,3-propanediol dicarbamate, N-cycloheptyl-2-methyl-2-(n)propyl-1,3-propanediol dicarbamate.

Others may practice the invention in any of the numerous ways which will be suggested by this disclosure to one skilled in the art. All such practice of the invention is considered to be a part hereof provided it falls within the scope of the appended claims.

I claim:
1. N-cyclobutyl-2-methyl-2-(n)propyl-1,3-propanediol dicarbamate.
2. N-cyclopropyl-2-methyl-2-(n)propyl-1,3-propanediol dicarbamate.

References Cited in the file of this patent
UNITED STATES PATENTS

| | | |
|---|---|---|
| 2,794,810 | Cusic | June 4, 1957 |
| 2,816,910 | Junkmann et al. | Dec. 17, 1957 |

OTHER REFERENCES

Chemical Week, page 71, June 6, 1959.

UNITED STATES PATENT OFFICE
CERTIFICATE OF CORRECTION

Patent No. 3,037,045                                    May 29, 1962

Bruce W. Horrom

It is hereby certified that error appears in the above numbered patent requiring correction and that the said Letters Patent should read as corrected below.

Column 1, lines 15 to 20, the formula should appear as shown below instead of as in the patent:

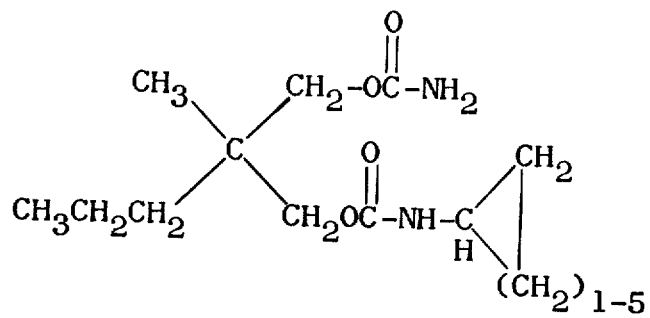

same column 1, lines 63 to 67, the formula should appear as shown below instead of as in the patent:

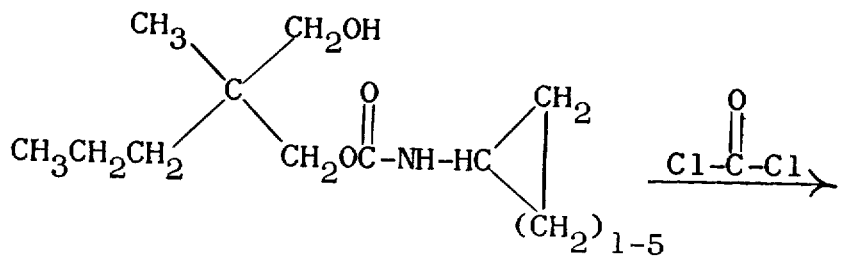

column 3, line 4, for "5.58%" read -- 8.58% --.

Signed and sealed this 15th day of January 1963.

(SEAL)
Attest:

ERNEST W. SWIDER
Attesting Officer

DAVID L. LADD
Commissioner of Patents